United States Patent
Oelrich, Jr. et al.

(10) Patent No.: US 11,049,622 B2
(45) Date of Patent: Jun. 29, 2021

(54) METHOD TO PRESSURIZE SIC FUEL CLADDING TUBE BEFORE END PLUG SEALING BY PRESSURIZATION PUSHING SPRING LOADED END PLUG

(71) Applicant: Westinghouse Electric Company LLC, Cranberry Township, PA (US)

(72) Inventors: Robert L. Oelrich, Jr., Columbia, SC (US); Peng Xu, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 564 days.

(21) Appl. No.: 15/895,472

(22) Filed: Feb. 13, 2018

(65) Prior Publication Data

US 2019/0252081 A1    Aug. 15, 2019

(51) Int. Cl.
| | |
|---|---|
| *G21C 3/10* | (2006.01) |
| *G21C 3/07* | (2006.01) |
| *G21C 21/02* | (2006.01) |
| G21C 3/18 | (2006.01) |
| G21C 3/17 | (2006.01) |

(52) U.S. Cl.
CPC .................. *G21C 3/07* (2013.01); *G21C 3/10* (2013.01); *G21C 21/02* (2013.01); *G21C 3/17* (2013.01); *G21C 3/18* (2013.01)

(58) Field of Classification Search
CPC ... G21C 3/07; G21C 3/10; G21C 3/17; G21C 3/18; G21C 21/02
See application file for complete search history.

(56) References Cited

U.S. PATENT DOCUMENTS

| | | | |
|---|---|---|---|
| 3,427,222 A | 2/1969 | Biancheria et al. | |
| 4,542,267 A * | 9/1985 | Christiansen | G21C 3/10 219/604 |
| 4,548,347 A * | 10/1985 | Christiansen | G21C 21/02 228/48 |
| 4,641,408 A * | 2/1987 | Klapper | G21C 3/10 29/271 |
| 4,660,270 A * | 4/1987 | Rieben | G21C 3/10 29/525 |
| 5,075,075 A | 12/1991 | Kapil | |
| 5,182,077 A | 1/1993 | Feinroth | |
| 5,191,185 A * | 3/1993 | John, Jr. | B23K 9/028 219/60 R |
| 5,319,178 A * | 6/1994 | Sando | G21C 3/10 219/125.11 |
| 5,338,576 A | 8/1994 | Hanzawa et al. | |

(Continued)

*Primary Examiner* — Lily C Garner
(74) *Attorney, Agent, or Firm* — K&L Gates LLP

(57) ABSTRACT

An apparatus and method for pressurizing SiC clad rods of a nuclear core component. A lower end of the rod is sealed with a lower end plug and an upper end of the rod is sealed between the cladding and an external piece of an upper end plug that has a through opening through which a separate internal piece of the upper end plug extends. The internal piece of the upper end plug is initially moveable within the through opening between an upper position that forms a gas tight seal and a lower position that forms a gaseous path through the through opening. The rod is placed in a pressure chamber pressurized to a desired pressure. When the pressure is reduced within the pressure chamber the internal pressure in the rod biases the internal piece of the upper end plug in the upper sealed position.

11 Claims, 3 Drawing Sheets

(56) References Cited

U.S. PATENT DOCUMENTS

| | | | |
|---|---|---|---|
| 5,345,488 A * | 9/1994 | Skipper | G21C 3/10 376/451 |
| 5,391,428 A | 2/1995 | Zender | |
| 5,448,034 A * | 9/1995 | Skipper | G21C 3/10 219/74 |
| 5,608,768 A * | 3/1997 | Matzner | G21C 3/10 376/451 |
| 5,813,299 A * | 9/1998 | Soucy | B23D 21/04 82/61 |
| 6,246,740 B1 | 6/2001 | Maruyama et al. | |
| 6,697,448 B1 | 2/2004 | Korton | |
| 7,139,360 B2 | 11/2006 | Lahoda | |
| 9,847,143 B2 * | 12/2017 | Boatwright | G21C 3/10 |
| 2006/0039524 A1 | 2/2006 | Feinroth et al. | |
| 2007/0189952 A1 | 8/2007 | Easler et al. | |
| 2016/0254067 A1 | 9/2016 | Mazzoccoli et al. | |
| 2016/0358673 A1 | 12/2016 | Xu et al. | |
| 2017/0159186 A1 | 6/2017 | Burke et al. | |

* cited by examiner

METHOD TO PRESSURIZE SIC FUEL CLADDING TUBE BEFORE END PLUG SEALING BY PRESSURIZATION PUSHING SPRING LOADED END PLUG

BACKGROUND

1. Field

This invention relates generally to nuclear fuel rods and control rods and, more particularly, to methods and apparatus for pressurizing nuclear fuel rods and control rods with a thermally conductive gas.

2. Related Art

In a typical nuclear reactor, such as a pressurized water (PWR), heavy water reactor (such as a CANDU) or a boiling water reactor (BWR), the reactor core includes a large number of fuel assemblies, each of which is composed of a plurality of elongated fuel elements or fuel rods. The fuel rods each contain nuclear fuel fissile material such as at least one of uranium dioxide ($UO_2$), plutonium dioxide ($PuO_2$), uranium nitride (UN) and/or uranium silicide ($U_3Si_2$); with possible additions of, for example, boron or boron compounds, gadolinium or gadolinium compounds and the like either on or in pellets, usually in the form of a stack of nuclear fuel pellets, although annular or particle forms of fuel are also used. The fuel rods have a cladding that acts as a containment for the fissile material. The fuel rods are grouped together in an array which is organized to provide a neutron flux in the core sufficient to support a high rate of nuclear fission and thus the release of a large amount of energy in the form of heat. A coolant, such as water, is pumped through the core in order to extract the heat generated in the core for the production of useful work. Fuel assemblies vary in size and design depending on the desired size of the core and the size of the reactor.

In conventional reactors, the cladding on the fuel rods is usually made from zirconium (Zr) with up to about 2 wt. % of other metals such as Nb, Sn, Fe and Cr. Such zirconium alloy clad tubes are taught, for example, by Biancheria et al., Kapil and Lahoda (U.S. Pat. Nos. 3,427,222; 5,075,075; and 7,139,360, respectively). The fuel rods/cladding have an end cap at each end and a hold down device such as a metal spring to keep the stack of nuclear fuel pellets in place. FIG. 1 illustrates this type of prior art design, showing a string of fuel pellets 10, a zirconium-based cladding 12, a spring hold-down device 14, and end caps 16.

There are problems associated with metal clad fuel rods. They can wear if contacted by debris that may be present in the cooling water mentioned before. Under severe conditions such as "beyond design basis" accidents, metal cladding can react exothermally with steam at over 1,093 degree C. (2,000 degree F.). The zirconium cladding metals protecting the nuclear fuel may lose strength during "a loss of coolant" accident, where reactor temperatures can reach as high as 1,204 degree C. (2,200 degree F.), and expand due to internal fission gases within the fuel rod. In addition, continuing utility industry demands have pushed reactor operating temperatures and cladding radiation exposure to extreme limits.

All this has prompted considering use of experimental ceramic type materials such as silicon carbide (SiC) monolith, fibers and their combinations as taught by Maruyama et. al. (U.S. Pat. No. 6,246,740), Zender, (U.S. Pat. No. 5,391,428), Hanzawa et al., (U.S. Pat. No. 5,338,576); Feinroth (U.S. Pat. No. 5,182,077 and U.S. Patent Publication No. 2006/0039524 A1), Easier et al. (U.S. Patent Publication No. 2007/0189952 A1); and tangentially Korton, (U.S. Pat. No. 6,697,448) as complete or partial substitutes for metal fuel rods.

The ceramic models that have evolved are no longer experimental and are generally shown to have high mechanical strength, and are thought capable of realizing the required gas-tightness desired for operation in a nuclear reactor. The desire to use these ceramic models as a nuclear cladding has given rise to a wealth of sealing technologies (e.g., experimental spark plasma sintering-hereinafter "SPS") described by Munir et al., "The effect of electric field and pressure on the synthesis and consolidation of materials" herein incorporated by reference, describes: a review of the spark plasma sintering method, J. Mater Sci., 41 (2006) 763, 777. Hot isostatic pressure (HIP), a well-known technique for use in many commercial areas, can also be used to join SiC to SiC to secure end plugs to a ceramic cladding. However, sealing a SiC rod with pressurized helium filling the interior void area is a challenge, because most of the SiC sealing or joining technologies are high temperature processes and are quite often conducted in a vacuum.

What is still needed is a practical way to pressurize the interior of a SiC cladding with a thermal conductive gas such as helium. Accordingly, it is an object of this invention to provide a method and apparatus that will enable the efficient pressurization of a SiC clad nuclear fuel rod in a production line environment.

SUMMARY

Accordingly, this invention provides a method of pressurizing a nuclear core component having a tubular cladding with an upper and lower end, such as a fuel rod or a control rod. The method comprises the step of closing off a lower end of the cladding with a lower end plug fixture configured to form a gas tight seal. The method then loads an active element into the lower end of an interior of the cladding, above the lower end plug, leaving an empty plenum in the interior of the cladding above the active element. Then a spring is inserted within the empty plenum between the upper end of the cladding and the active element, the spring being configured to bias the active element towards the lower end plug when the upper end of the cladding is closed off by an upper end plug. Next, the method performs the step of closing off the upper end of the cladding with an upper end plug fixture comprising the upper end plug including an upper end plug external piece and an upper end plug internal piece. The upper end plug internal piece is configured to slide within a through opening in the upper end plug external piece and has a lower end that biases the spring towards the active element when the upper end plug fixture forms a gas tight seal at an interface of the cladding and the upper end plug, at least partially closing off the upper end of the cladding. The through opening and the upper end plug internal piece are configured so an upper portion of the upper end plug internal piece fits within the through opening, but cannot pass through and out of an upper portion of the through opening, and the spring is configured to support the upper end plug internal piece within the through opening. The upper end plug internal piece and the through opening are configured to form a substantially gas tight seal at an upper limit of travel of the upper end plug internal piece through the through opening and a gas communication path at a point below the upper limit of travel. The method then places the cladding with the upper end plug fixture and the lower end plug fixture in a pressure chamber, introduces a filler gas into the pressure chamber, and raises the pressure of the filler gas within the pressure chamber to a preselected pressure for a given period of time. The method then seals the upper end plug internal piece to the upper end plug external piece. Preferably, before the filler gas is introduced into the pressure chamber a vacuum is drawn upon the interior of the pressure chamber.

In one embodiment, the method includes the step of permanently sealing the upper end plug and the lower end plug to the cladding, preferably after removing the cladding with the upper end plug and lower end plug from the pressure chamber after the given period of time. After removing the cladding from the pressure chamber the upper end plug internal piece can also be permanently sealed to the upper end plug external piece. The method may also include the step of placing a binding agent at an interface of a wall of the through opening and an abutting wall of the upper end plug internal piece. The binding agent may be, for example, a SiC paste, graphite, silver, titanium, aluminum, alloys with the elements listed, etc. In one such embodiment the closing off the lower end of the cladding and the step of closing off the upper end of the cladding is performed with a clamp, such as a mechanical or hydraulic clamp. The step of sealing the upper end plug internal piece to the upper end plug external piece is preformed, preferably, by reducing the pressure of the filler gas within the pressure chamber after the given period of time.

This invention also contemplates a nuclear core component having a tubular cladding with an upper and lower end respectively sealed by an upper end plug and a lower end plug, such as, for example, a fuel rod or a control rod. A lower portion of an interior of the cladding houses an active element with a spring extending between the upper end plug and the active element to bias the active element toward the lower end plug. The upper end plug comprises an upper end plug external piece and an upper end plug internal piece, the upper end plug internal piece is configured to slide within a through opening in the upper end plug external piece and have a lower end that biases the spring towards the active element when the upper end plug forms a gas tight seal at an interface of the cladding and the upper end plug, at least partially closing off the upper end of the cladding. The through opening and the upper end plug internal piece are configured so an upper portion of the upper end plug internal piece fits within the through opening but cannot pass through and out of an upper portion of the through opening. The spring is configured to support the upper end plug internal piece within the through opening. The upper end plug internal piece and the through opening are also configured to form a substantially gas tight seal at an upper limit of travel of the upper end plug internal piece through the through opening and a gas communication path at a point below the upper limit of travel. The upper end plug internal piece is also structured to be permanently sealed to the upper end plug external piece after an interior of the cladding is pressurized. In one embodiment the upper end plug external piece through opening has a frustoconical wall and an interfacing wall of the upper end plug internal piece has a frustoconical contour with a smallest diameter of the frustoconical contour larger than a smallest diameter of the frustoconical wall.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

In many conventional reactors the standard fuel cladding is made of various zirconium alloys that act as the fission product barrier and prevent release of radioactive materials to the environment. Though zirconium alloys have desirable neutronic properties and, in the past, adequate strength and oxidation resistance in coolant at normal operating conditions, these types of cladding rapidly oxidize at beyond design basis temperatures above 1,200 degree C. Because the zirconium steam reaction is exothermic and rapid, and hydrogen is produced during this reaction, which can be explosive, new materials such as silicon carbide (SiC) have been proposed and experimentally tested to replace the zirconium alloy cladding. The SiC materials have much better oxidation resistance than zirconium alloys at temperatures above 1,200 degree C. Advanced SiC-based materials are no longer in the complete experimental stage and can vastly improve the fuel failure temperature by >600 degrees C., compared to zirconium alloy cladding-which in itself is extremely beneficial for safe reactor operation. This application describes a method and apparatus for pressurizing such a ceramic cladding with ceramic end caps. Though the preferred embodiment will be described with an application to a nuclear fuel rod, it should be appreciated that the method and apparatus disclosed herein and claimed hereafter are equally applicable to control rods.

Figure 1:
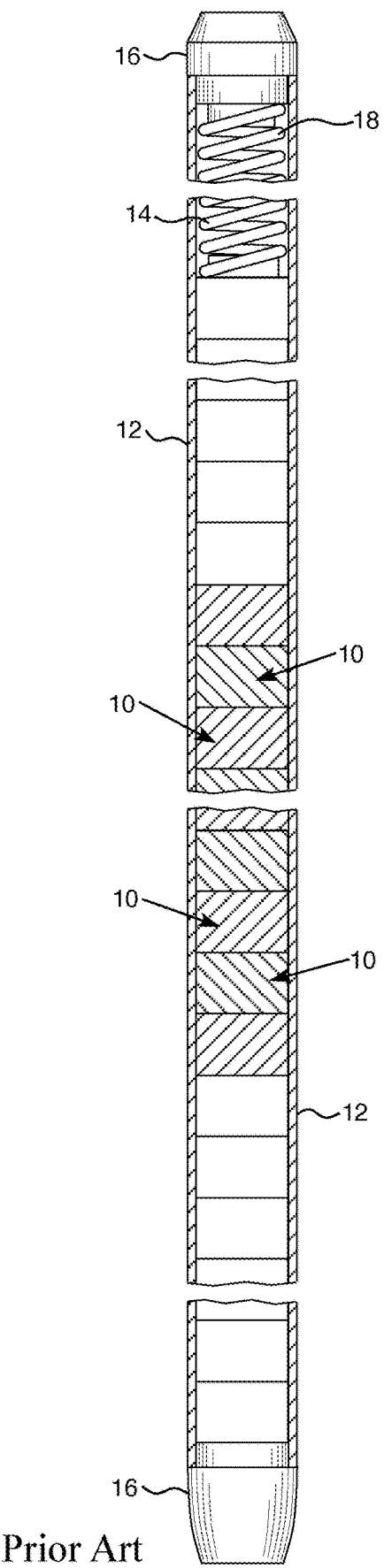
FIG. 1 is a longitudinal sectional view of a prior art fuel rod containing a stack of fuel pellets, a holding spring and end caps.

For the purpose of comparison, FIG. 1 shows a longitudinal cross-section of a conventional fuel rod. As shown in FIG. 1, the fuel rod cladding 12 is typically in the shape of an elongated tube having a cavity formed therein and two opposing open ends. The thickness of the tube wall can vary. In certain embodiments, the tube wall thickness is typically from about 500 to about 1,000 microns. The cavity has fuel pellets 10 contained therein and typically a hold-down device, such as a spring 14, to maintain the configuration, e.g., a stack, of the fuel pellets. A sealing mechanism, such as the end caps 16, is typically positioned at or in each open end of the cladding 12 to provide a seal and prevent the coolant circulating in the core from entering the cavity of fuel rod cladding. Typically, the plenum area 18 occupied by the spring 14 is pressurized with a thermally conductive gas such as helium to 400 to 500 psi.

Figure 2:
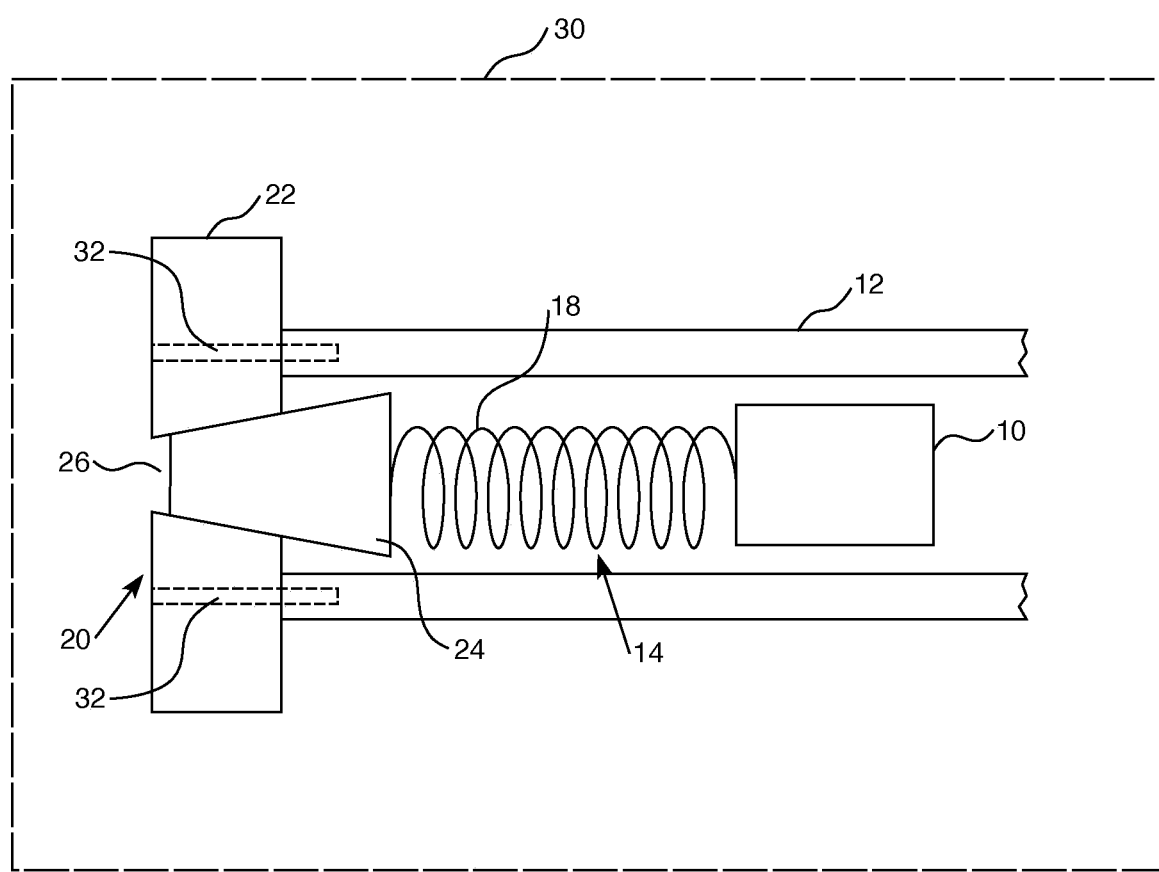
FIG. 2 is a longitudinal sectional view of an upper section of a nuclear fuel element formed in accordance with this invention, showing the upper most fuel pellet, the plenum spring and an upper end plug comprising an external piece with a through opening closed off by an internal piece.

FIG. 2 shows a longitudinal cross-section of the upper portion of a fuel rod, modified in accordance with this invention, showing a ceramic cladding 12, such as SiC, housing an upper most fuel pellet 10, and plenum spring 14, with the cladding 12 closed at an upper end by an upper end plug 20. Typically, to seal the SiC cladding to the end plug one of a number of processes can be employed such as a high temperature polymer infiltration pyrolysis (PIP) process, chemical vapor infiltration (CVI), chemical vapor deposition (CVD), hot isostatic press (HIP) or spark plasma sintering (SPS). These processes are typically performed above 1,000° C. and conducted in a vacuum with an exception of HIP, which may permit a helium and/or an inert gas environment. In order to pressurize the SiC clad rods with a high thermal conductivity gas, such as helium, a specially designed end plug is used to seal off the upper portion of the cladding. The upper end plug 20 is comprised of two separable parts, an upper end plug external piece 22 that around its periphery forms the seal with the cladding 12 and an upper end plug internal piece 24, which rides within a through opening 26 in the upper end plug external piece 22. In addition to chemically bonding the external piece 22 to the cladding 12, the external piece 22 can also be mechanically joined to the cladding 12 with a bolt/screw type of coupling as schematically shown in FIG. 2 by reference character 32. The term "through opening" means that the opening extends completely through the upper end plug external piece 22 exposing the plenum to the external environment. In one embodiment, the interior wall of the through opening has a frustoconical profile and the opposing exterior wall of the upper end plug internal piece has a matching frustoconical contour with the corresponding diameters of the profile and contour being substantially equal or the contours corresponding diameters being slightly larger than those of the profile. It should be appreciated that other interfacing profiles and contours can also be used so long as the interfacing walls of the through opening 26 and the upper end plug internal piece 24 prevent the upper end plug internal piece from traveling completely through and out of the through opening; at a limit of upward travel of the upper end plug internal piece 24 in the through opening 26, the interface of the profile and contour forms a gas tight seal; and at a point below the limit of upward travel the interface of the profile and contour forms a gaseous pathway through the through opening, exposing the internal plenum to the environment outside the upper end plug 20. It is perfectly acceptable for the upper end plug internal piece 24 to protrude partially through the through opening 26 to extend beyond the upper end plug external piece 22.

Figure 3:
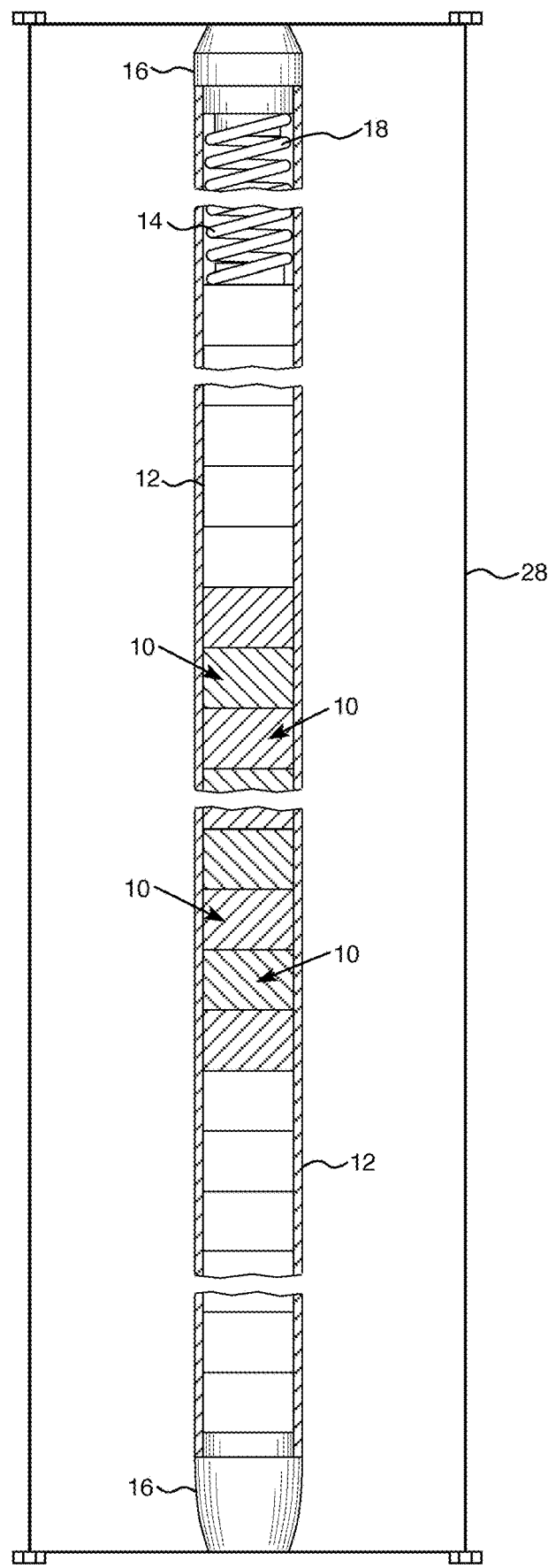
FIG. 3 is a longitudinal sectional view of a fuel element formed in accordance with this invention as shown in FIG. 2, with the end plugs sealed to the cladding with a clamp.

To pressurize the rods, the SiC fuel rods are prepared in a way similar to the current zirconium fuel rods. The SiC lower end plug is held against the cladding, the fuel pellets 10 are loaded, the spring 14 and the upper end plug internal piece 24 are inserted into the plenum and the upper end plug external piece 22 is pressed over the upper end of the cladding to form a gas tight seal. The spring 14 supports the upper end plug internal piece 24 in the through opening 26 and the spring 14 is, preferably, attached to the underside of the upper end plug internal piece 24. The upper and lower end plugs can either be pressed in place to form the gas tight seal by mechanical means such as a hydraulic or mechanical clamp, such as the clamp 28 shown in FIG. 3 or they can be permanently sealed using a chemical process such as PIP, CVI, CVD, and/or SPS.

The fully assembled rod is placed or the end plug segment is placed within a pressure chamber 30 and a thermally conductive gas, such as helium is introduced into the chamber and the pressure is increased to a level in the order of 500 psi. A vacuum may be applied to the interior of the cladding before pressurization. The pressure of the gas in the pressure chamber acts upon the upper end plug internal piece 24 compressing the spring 14 and filling the plenum. Alternately, the internal piece 24 can be pushed by an external force to open up the gap between the external piece 22 and the internal piece 24. The inside of the cladding will automatically be filled with the gas at the same pressure as the pressure chamber. The pressure in the pressure chamber is then reduced to approximately atmospheric pressure after a selected period of time and the pressure inside the cladding is maintained at the level it was raised to by the mechanical seal between the upper end plug external piece 24 and the through opening 26. The higher pressure in the plenum forces the contour of the wall of the upper end plug internal piece 24 against the contour of the through opening 26 to maintain that seal. Preferably, a binding agent such as SiC paste or graphite is inserted at the interface of the through opening and the upper end plug internal piece during the assembly of the rod to improve the seal. After the pressurization is complete the pressurized rod can be removed to a vacuum chamber where the interface of the upper end plug internal piece and the through opening, and the end plugs if not previously permanently sealed, can be permanently sealed.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of pressurizing a nuclear core component having a tubular cladding with an upper and lower end, comprising the steps of:

closing off a lower end of the cladding with a lower end plug fixture configured to form a gas tight seal;

loading an active element into the lower end of an interior of the cladding above the lower end plug leaving an empty plenum in the interior of the cladding above the active element;

inserting a spring within the empty plenum between the upper end of the cladding and the active element, the spring being configured to bias the active element towards the lower end plug fixture when the upper end of the cladding is closed off by an upper end plug fixture;

closing off the upper end of the cladding with the upper end plug fixture comprising an upper end plug external piece and an upper end plug internal piece, the upper end plug internal piece configured to slide within a through opening in the upper end plug external piece and have a lower end that biases the spring towards the active element when the upper end plug fixture forms a gas tight seal at an interface of the cladding and the upper end plug at least partially closing off the upper end of the cladding, the through opening and the upper end plug internal piece configured so an upper portion of the upper end plug internal piece fits within the through opening but cannot pass through and out of an upper portion of the through opening and the spring is configured to support the upper end plug internal piece within the through opening, the upper end plug internal piece and the through opening forming a substantially gas tight seal at an upper limit of travel of the upper end plug internal piece through the through opening and a gas communication path at a point below the upper limit of travel;

placing at least the upper end of the cladding, with the upper end plug fixture and the lower end plug fixture in place, in a pressure chamber;

applying a vacuum to an interior of the cladding;

introducing a filler gas into the pressure chamber;

raising the pressure of the filler gas within the pressure chamber to a preselected pressure for a given period of time; and sealing the upper end plug internal piece to the upper end plug external piece.

2. The method of claim 1 including the step of permanently sealing the upper end plug fixture and the lower end plug fixture to the cladding.

3. The method of claim 2 including the step of removing the cladding with the upper end plug fixture and the lower end plug fixture from the pressure chamber after the given period of time and wherein the step of permanently sealing the upper end plug fixture and the lower end plug fixture to the cladding is performed after the removing step.

4. The method of claim 3 including the step of permanently sealing the upper end plug internal piece to the upper end plug external piece after the removing step.

5. The method of claim 1 wherein the step of closing off of the lower end of the cladding and the step of closing off of the upper end of the cladding is performed with a clamp or other fixture that forces the upper end plug external piece against the cladding.

6. The method of claim 5 wherein the clamp is a mechanical or hydraulic clamp.

7. The method of claim 1 including the step of placing a binding agent at an interface of a wall of the through opening and an abutting wall of the upper end plug internal piece.

8. The method of claim 7 wherein the binding agent comprises one or more of SiC paste, graphite, silver, titanium or aluminum.

9. The method of claim 1 wherein the step of sealing the upper end plug internal piece to the upper end plug external piece is performed by reducing the pressure of the filler gas within the pressure chamber after the given period of time, or otherwise removing a force pushing against the upper end plug internal piece biasing the upper end plug internal piece into an interior of the cladding.

10. The method of claim 1, prior to the step of introducing the filler gas and subsequent to the step of placing the cladding in the pressure chamber, including the step of drawing a vacuum on the pressure chamber.

11. The method of claim 1 including the step of mechanically attaching the upper end plug external piece to the cladding.

* * * * *